US012359499B2

(12) United States Patent
Hashimoto et al.

(10) Patent No.: US 12,359,499 B2
(45) Date of Patent: Jul. 15, 2025

(54) BUILDING STRUCTURE

(71) Applicant: SEKISUI HOUSE, LTD., Osaka (JP)

(72) Inventors: Dai Hashimoto, Osaka (JP); Hirokazu Miyachi, Osaka (JP); Yuya Hasegawa, Osaka (JP); Takahiro Suezawa, Osaka (JP); Tatsuya Ishikawa, Osaka (JP); Yasuaki Takahashi, Osaka (JP)

(73) Assignee: SEKISUI HOUSE, LTD., Osaka (JP)

( * ) Notice: Subject to any disclaimer, the term of this patent is extended or adjusted under 35 U.S.C. 154(b) by 482 days.

(21) Appl. No.: 18/001,652

(22) PCT Filed: Jun. 21, 2021

(86) PCT No.: PCT/JP2021/023321
§ 371 (c)(1),
(2) Date: Dec. 13, 2022

(87) PCT Pub. No.: WO2022/024584
PCT Pub. Date: Feb. 3, 2022

(65) Prior Publication Data
US 2023/0235622 A1 Jul. 27, 2023

(30) Foreign Application Priority Data
Jul. 31, 2020 (JP) ................................ 2020-129891

(51) Int. Cl.
*E06B 9/17* (2006.01)

(52) U.S. Cl.
CPC ........ *E06B 9/1703* (2013.01); *E06B 9/17061* (2013.01)

(58) Field of Classification Search
CPC ....... E06B 9/1703; E06B 9/17061; E06B 9/17
See application file for complete search history.

(56) References Cited

U.S. PATENT DOCUMENTS 4,726,409 A * 2/1988 Besler ..................... E06B 9/581
160/23.1
5,067,540 A * 11/1991 Besler .................. E06B 9/1703
160/31

(Continued)

FOREIGN PATENT DOCUMENTS

JP 1981-101095 U1 8/1981
JP 61-158561 A 7/1986

(Continued)

OTHER PUBLICATIONS

International Search Report issued in application No. PCT/JP2021/023321.

(Continued)

*Primary Examiner* — Paola Agudelo
(74) *Attorney, Agent, or Firm* — McClure, Qualey & Rodack, LLP

(57) ABSTRACT

A building structure 1*a*, 1*b*, and 1*c* incorporates an outer wall 6 provided on a lower side of a sloped ceiling 2 in a slope direction, an opening part 5 formed in the outer wall 6, a box-shaped groove part 15 formed at a lower end of the sloped ceiling 2 along the outer wall 6 and having a lower opening 14 opened downward, and an attachment part 17 provided inside the groove part 15 and to which an upper end part of a light shielding material 16 that shields light incident on the opening part 5 is attached, wherein the groove part 15 is a ceiling-embedded type embedded in the sloped ceiling 2, and a lower end of a side plate of the groove part 15 on a side opposite to the opening part 5 is lower than a height of a lower surface of a frame 23 on an upper side of the opening part 5.

15 Claims, 6 Drawing Sheets

(56) References Cited

U.S. PATENT DOCUMENTS

| | | | | | |
|---|---|---|---|---|---|
| 5,161,593 | A * | 11/1992 | Hirabayashi | E06B 9/1703 160/310 |
| 5,862,851 | A * | 1/1999 | Stoebich | E06B 9/58 160/246 |
| 6,247,517 | B1 * | 6/2001 | Drifka | E06B 9/58 160/44 |
| 7,730,925 | B1 * | 6/2010 | Pereira | E06B 9/262 160/348 |
| 8,505,865 | B2 * | 8/2013 | Wills | E06B 9/42 248/224.8 |
| 11,454,063 | B2 * | 9/2022 | Shan | E06B 9/42 |
| 2011/0008135 | A1 * | 1/2011 | Black | E04B 1/3527 414/800 |
| 2018/0266177 | A1 * | 9/2018 | Sivritepe | E06B 9/0692 |
| 2020/0208464 | A1 * | 7/2020 | Guest | E06B 9/1703 |
| 2023/0167677 | A1 * | 6/2023 | Benotto | E06B 9/17007 160/23.1 |

FOREIGN PATENT DOCUMENTS

| | | | |
|---|---|---|---|
| JP | 6-20736 | U1 | 3/1994 |
| JP | 2007-37986 | A | 2/2007 |
| JP | 2009-185562 | A | 8/2009 |
| JP | 2015-108224 | A | 6/2015 |

OTHER PUBLICATIONS

Takada Architectural Office website; "Ideas for near the window"4 Window frame height ideas;" https://www.takada-7arc.com/blog/10783>; 2019; pp. 1-4.

* cited by examiner

[FIG.1]
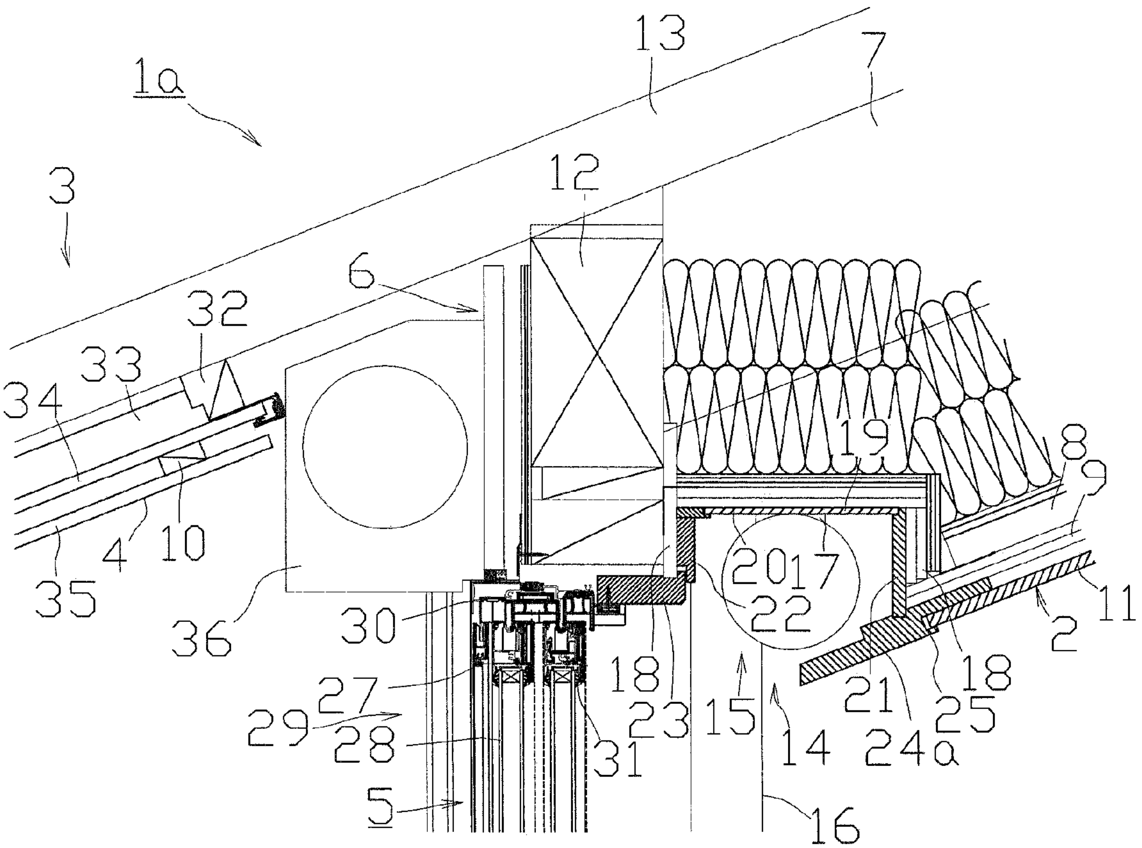

[FIG.2]
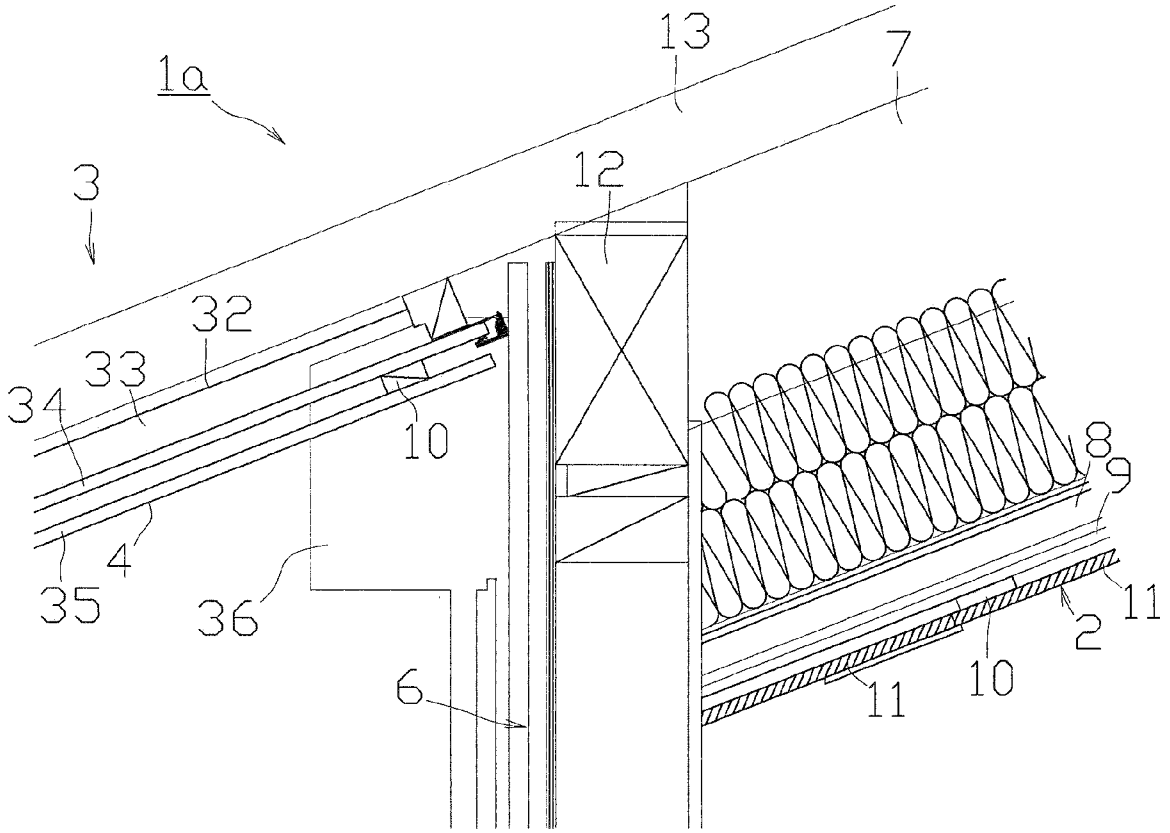

[FIG.3]
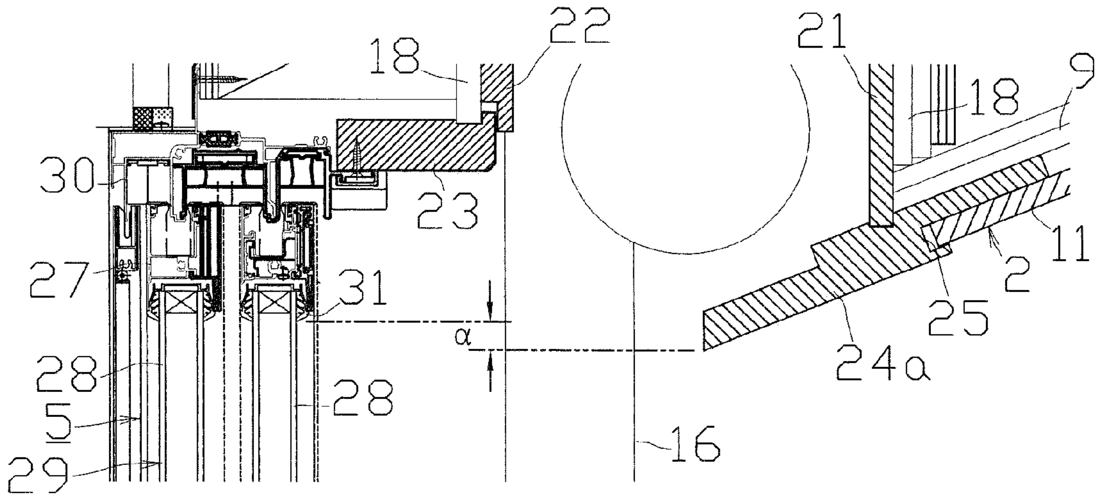

[FIG.4]
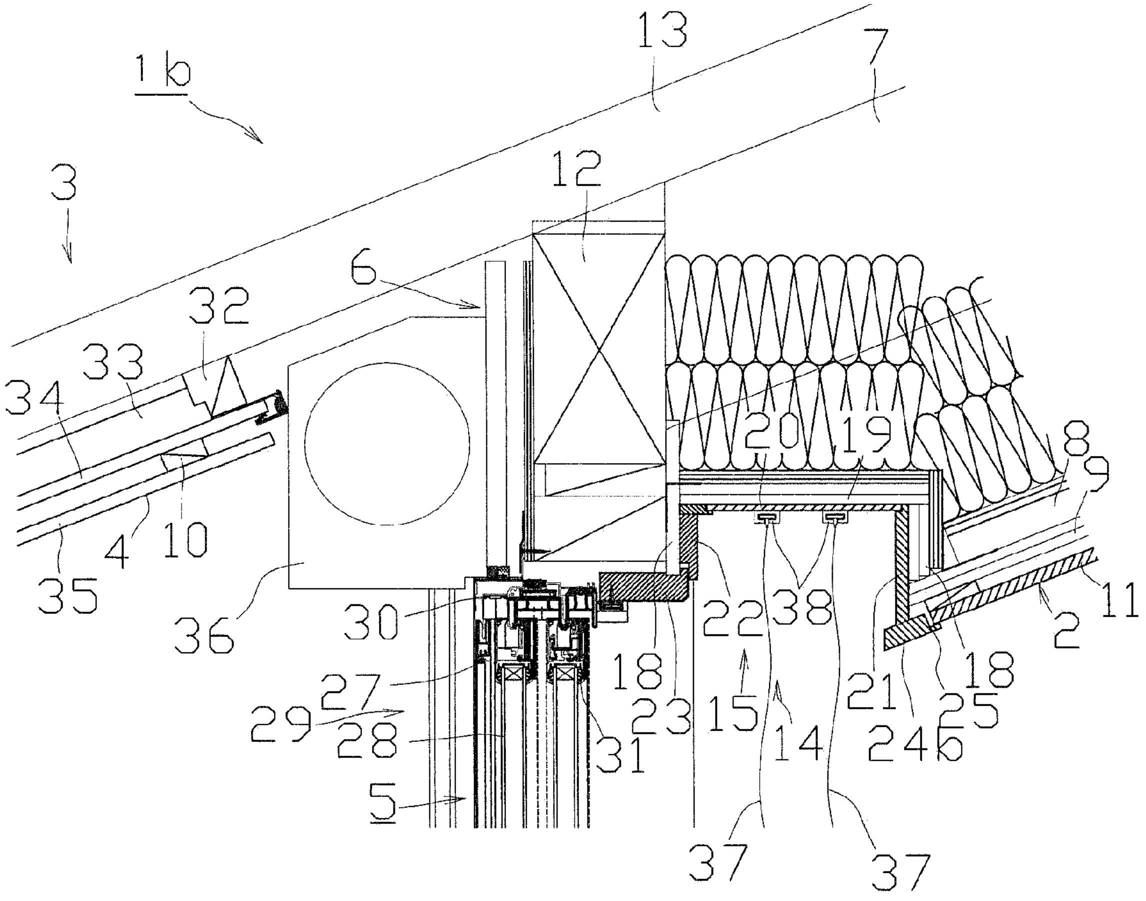

[FIG.5]
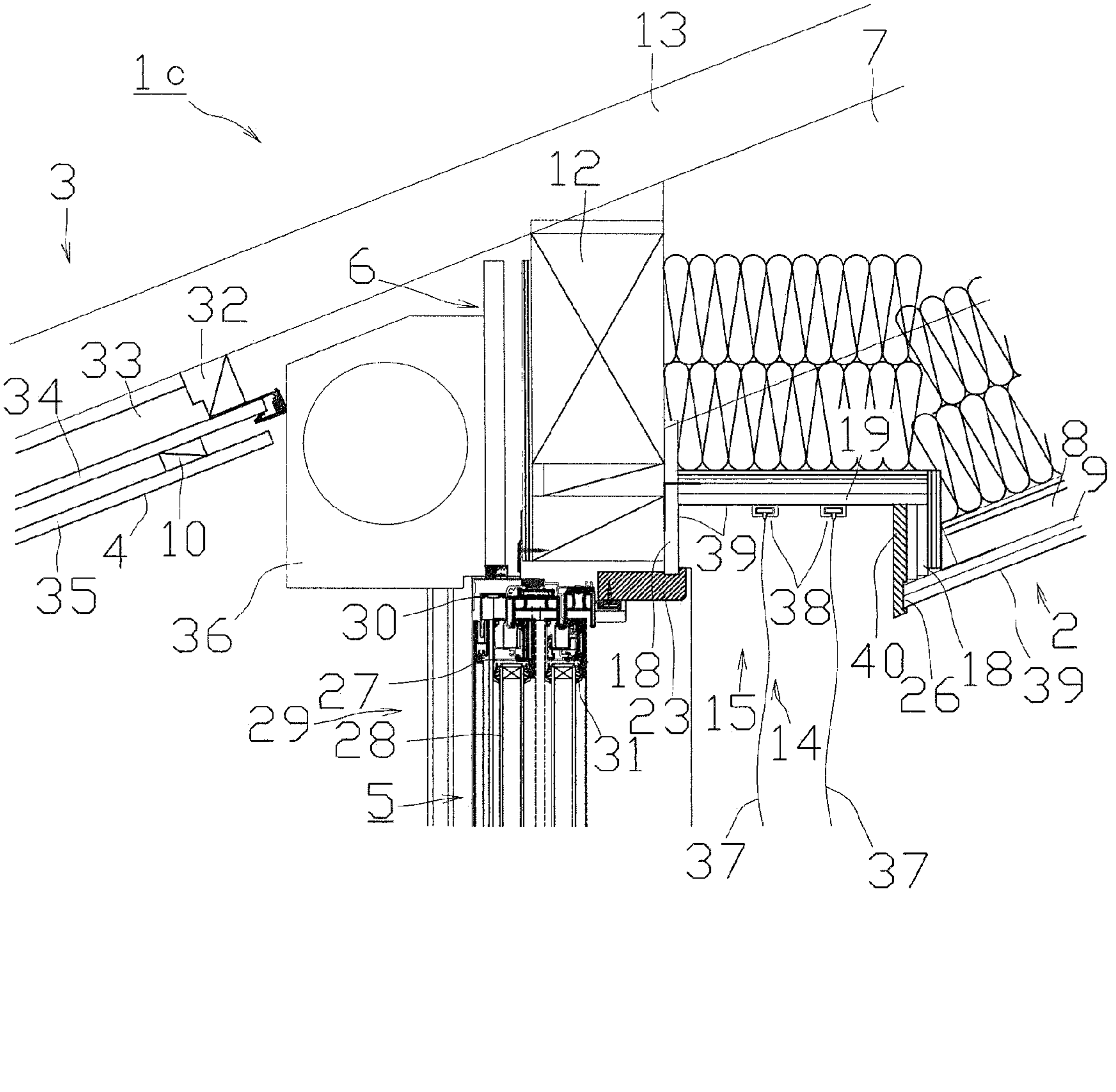

[FIG.6]
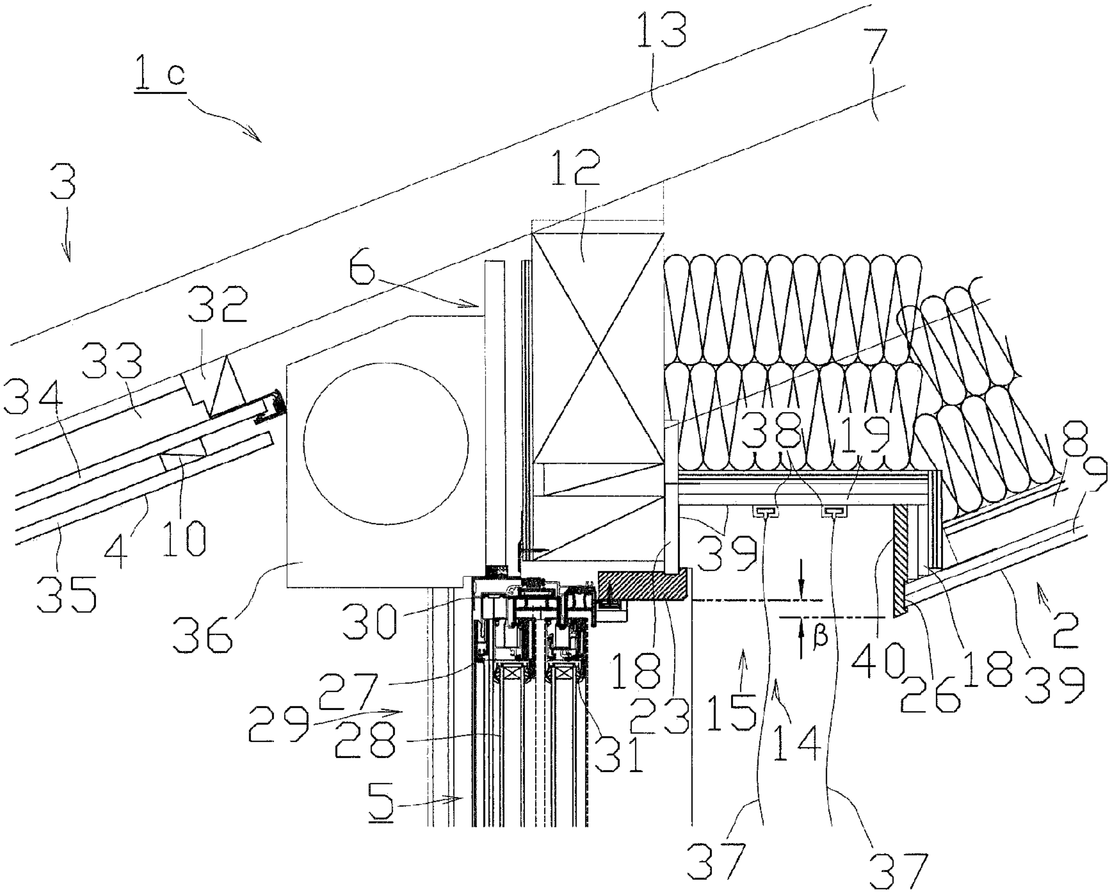

BUILDING STRUCTURE

TECHNICAL FIELD

The present invention relates to a building structure including a sloped ceiling and a groove part such as an embedded-type curtain box disposed on the sloped ceiling.

BACKGROUND ART

Conventionally, there has been proposed a building structure which is a building including a sloped ceiling and in which an embedded-type curtain box is disposed (See, for example, Patent Literature 1). The sloped ceiling and the curtain box disclosed in Patent Literature 1 are formed of plasterboard. Further, a joiner having a substantially inverted T-shape in a side view is disposed at a joint part between a lower end of the sloped ceiling and a side plate of the curtain box. Then, by covering a cloth from the sloped ceiling to the inside of the curtain box through the joiner, the cloth is stuck without generating wrinkles.

CITATION LIST

Patent Literatures

Patent Literature 1: JP 1994-20736 A

SUMMARY OF THE INVENTION

Technical Problems

In the building structure in Patent Literature 1, a positional relationship between an opening part such as a window and a curtain box is not described. By the way, in recent years, it is required to provide a ceiling height sash of a large opening around the opening part to produce connection between an indoor space and an outdoor space and to make the indoor space a more comfortable space. On the other hand, the curtain box forms a visual boundary on the ceiling, and tends to give an impression that indoor and outdoor spaces are separated.

Therefore, an object of the present invention is to provide a building structure having a sloped ceiling provided with a groove part such as a ceiling-embedded curtain box, which can give an impression of being opened to the outside from a lower end of the sloped ceiling and can produce connection between an indoor space and an outdoor space.

Solutions to Problems

The building structure of the present invention comprises an outer wall provided on a lower side of a sloped ceiling in a slope direction, an opening part formed in the outer wall, a box-shaped groove part formed at a lower end of the sloped ceiling along the outer wall and having a lower opening opened downward, and an attachment part provided inside the groove part and to which an upper end part of a light shielding material that shields light incident on the opening part is attached, wherein the groove part is a ceiling-embedded type embedded in the sloped ceiling, and a lower end of a side plate of the groove part on a side opposite to the opening part is lower than a height of a lower surface of a frame on an upper side of the opening part.

In the building structure of the present invention, the groove part is formed to extend from a lower end of the side plate on the side opposite to the opening part toward a lower side of the groove part, and a cover body that covers a part of the lower opening of the groove part is formed, and the cover body has a flat plate shape, and a lower surface of the cover body has a slope identical with that of the sloped ceiling.

In the building structure of the present invention, the opening part has a translucent part in a rectangular frame, and an upper end of the translucent part is higher than a lower end of the cover body.

In the building structure of the present invention, the cover body is formed of a material identical with a ceiling material forming the sloped ceiling in a color identical with that of the ceiling material.

In the building structure of the present invention, the cover body includes, on a base end side of the cover body, a parting part that covers an end face and a part of a lower surface of the ceiling material forming the sloped ceiling.

In the building structure of the present invention, the sloped ceiling is formed by attaching a decorative cloth to a base surface formed of a ceiling base material, the groove part has a pair of side surface base plates and an upper surface base plate connecting upper ends of the side surface base plates to each other, in the groove part, a decorative cloth identical with that of the sloped ceiling is attached to inner surfaces of the groove part of the side surface base plate on a side of the opening part and the upper surface base plate, and the side surface base plate on a side opposite to the opening part is covered with a decorative side plate in which a parting part that covers an end face and a part of a lower surface of the ceiling base plate forming the sloped ceiling is formed.

The building structure of the present invention comprises eaves on an outdoor side of the outer wall, and a shutter box on the opening part on the outdoor side of the outer wall, wherein an eaves rear of the eaves includes a refractory surface material on an upper side of a decorative eaves rear surface material, the eaves rear is parallel to the sloped ceiling, and an end part of the eaves rear on a side of the outer wall is disposed at a position higher than a lower end of the sloped ceiling, and the shutter box has an upper surface formed with a slope identical with that of the eaves rear, and an end part of the refractory surface material abuts on a side surface of the shutter box.

Advantageous Effects of Invention

According to the building structure of the present invention, since the lower end of the side plate of the groove part on the side opposite to the opening part is formed to be lower than the height of the lower surface of the frame on the upper side of the opening part, when viewed from an indoor side, it is visually recognized as if the opening part is disposed immediately below a lower end of the sloped ceiling, so that the outdoor side can be visually recognized through the opening part, and it is possible to give an impression that the sloped ceiling and the outdoors are connected.

According to the building structure of the present invention, the groove part is formed from the lower end of the side plate on the side opposite to the opening part toward the lower side of the groove part, and the cover body covering a part of the lower opening of the groove part is formed. Since the cover body has the same slope as that of the sloped ceiling, the cover body can be visually recognized as an extension of the sloped ceiling. When viewed from the indoor side, the lower opening of the groove part is less likely to be visually recognized, and the opening part is visually recognized as being disposed immediately below the tip of the cover body. Therefore, the outdoor side can be visually recognized through the opening part, and it is possible to give an impression that the sloped ceiling and the outdoor are connected.

According to the building structure of the present invention, since the upper end of the translucent part of the opening part is higher than the lower end of the cover body, the translucent part can be visually recognized immediately below the lower end of the cover body, and the translucent part is visually recognized as being disposed immediately below the cover body extended from the sloped ceiling, so that the outdoor side can be visually recognized from the tip of the cover body, and it is possible to give an impression that the sloped ceiling and the outdoors are connected.

According to the building structure of the present invention, since the cover body is formed of the same material as a ceiling material forming the sloped ceiling in the same color as that of the ceiling material, the sloped ceiling and the cover body are more integrally visually recognized, the tip of the cover body is visually recognized as an extension of the sloped ceiling, and it is possible to give an impression that the sloped ceiling and the outdoors are more connected.

According to the building structure of the present invention, since the parting part that covers the end face and a part of the lower surface of the ceiling material forming the sloped ceiling is formed on the base end side of the cover body, the cover body can also serve as a parting material, and the design property can be enhanced as compared with a case where the cover body abuts on the end face of the ceiling material.

According to the building structure of the present invention, since the same decorative cloth as that of the sloped ceiling is attached to the inner surfaces of the side surface base plate of the groove part on a side of the opening part and the upper surface base plate of the groove part, the same decorative cloth is attached to all the positions that are easily visually recognized when viewed from the indoor side, and the sloped ceiling and the groove part are integrated, so that the continuity with the outdoors can be maintained. Further, in the decorative upper plate covering the side surface base plate on the side opposite to the opening part, since the parting part covering the end face and a part of the lower surface of the ceiling material forming the sloped ceiling is formed, the parting part is formed without providing a cloth in a part where the sloped ceiling and the side plate have an acute angle, and it is possible to suppress breakage of the cloth.

According to the building structure of the present invention, the eaves rear of the eaves formed on the outdoor side of the outer wall is disposed in parallel at the same slope as that of the sloped ceiling, and the end part of the eaves rear on the side of the outer wall is disposed at a position higher than the lower end of the sloped ceiling, so that the indoors and outdoors can have a more integrated impression when viewed from the indoor side. Further, the refractory surface material disposed on the upper side of the decorative eaves rear surface material provided on the eaves rear abuts on the side surface of the shutter box to form the refractory line, and at a position where the shutter box is interrupted, the upper surface of the shutter box is formed with the same slope as that of the eaves rear, so that the side edge of the refractory surface material abuts on the side surface of the shutter box to form the refractory line.

BRIEF DESCRIPTION OF THE DRAWINGS

FIG. 1 is a cross-sectional view illustrating the building structure according to a first embodiment.

FIG. 2 is a cross-sectional view at a position where an opening part, a groove part, and a shutter box are not provided in the building structure according to the first embodiment.

FIG. 3 is a diagram illustrating the height relationship between an upper end of the translucent part and a lower end of the cover body in the building structure according to the first embodiment.

FIG. 4 is a cross-sectional view illustrating the building structure according to a second embodiment.

FIG. 5 is a cross-sectional view illustrating the building structure according to a third embodiment.

FIG. 6 is a diagram illustrating the height relationship between a lower end of a decorative side panel and the frame on the upper side of the opening part in the building structure according to the third embodiment.

DESCRIPTION OF EMBODIMENTS

First Embodiment

Hereinafter, a building structure 1*a* according to a first embodiment will be described with reference to FIGS. 1 to 3. The building structure 1*a* of the present embodiment is, for example, a building structure 1*a* of a wooden two-story detached house. The building structure 1*a* of the present invention is not limited to a wooden structure, and may be a building structure 1*a* used for a building made of steel frame or reinforced concrete. Further, the building structure 1*a* of the present invention is not limited to a detached house, and may be an apartment house or a non-residential building. Furthermore, the building structure 1*a* is not limited to a two-story building, and may be a one-story building or a building with three-stories or more. A building structure 1*a* of the present embodiment includes an indoor sloped ceiling 2, eaves 3 in which an eaves rear 4 has a slope parallel to the sloped ceiling 2, and an outer wall 6 formed at a boundary between the sloped ceiling 2 and the eaves rear 4 and having an opening part 5. In the present embodiment, the sloped ceiling 2 and the opening part 5 are formed on the second floor which is a top floor of the building, and the eaves 3 are continuously disposed from a roof (not illustrated). Note that the sloped ceiling 2 and the opening part 5 are not necessarily limited to those formed on the top floor. The eaves 3 are not limited to those disposed continuously from the roof, and may be disposed so as to protrude from the outer wall 6 of a lower floor than the top floor. The sloped ceiling 2 and the opening part 5 of the building structure 1*a* may be installed on any floor other than the top floor.

As illustrated in FIG. 1, the sloped ceiling 2 is formed as follows. First, a steel joist 8 is fixed parallel to a slope direction of the sloped ceiling 2 by suspending a joist receiver (not illustrated) on a slope beam 7. Then, a ceiling base plate 9 made of two plasterboards is attached to the steel joist 8. Thereafter, a board joist 10 extending in a horizontal direction is attached to the ceiling base plate 9, and a wooden plate-shaped ceiling material 11 is attached below the board joist to form the sloped ceiling 2. The slope beam 7 is bridged between a ridge beam (not illustrated) and a pole plate 12 disposed inside the outer wall 6 and above the opening part 5.

Further, a rafter 13 is fixed to an upper surface of the slope beam 7, and a sheathing roof board, a roofing material, and a roof material (not illustrated) are disposed on the rafter 13 to form a roof of the building.

The outer wall 6 is formed on a lower side of the sloped ceiling 2 in the slope direction, and the opening part 5 is formed in the outer wall 6. A box-shaped groove part 15 having a lower opening 14 opened downward is formed at a lower end of the sloped ceiling 2 along the outer wall 6 at a position where the opening part 5 is formed in the sloped ceiling 2. An attachment part 17 for fixing an upper end of a roll screen 16 is formed inside the groove part 15. The roll screen 16 includes a sheet-like screen body, a winding part capable of winding and drawing out the screen body, and an attachment part 17 for attaching the winding part to a decorative upper plate 20 of the groove part 15. The roll screen 16 is a light shielding material that is disposed on an indoor side of the opening part 5 and shields external light and a line of sight incident from the opening part 5. Note that the light shielding material of the present invention is not limited to the roll screen 16, and may be another light shielding material such as a curtain or a blind.

The groove part 15 forms a base groove by a pair of side surface base plates 18 made of plasterboard and an upper surface base plate 19 connecting upper ends of the pair of side surface base plates 18. In the groove part 15, the decorative upper plate 20 is attached to a lower surface of the upper surface base plate 19, a first decorative side plate 21 is attached to the side surface base plate 18 on a side away from the opening part 5, and a second decorative side plate 22 is attached to the side surface base plate 18 on a side of the opening part 5. The decorative upper plate 20, the first decorative side plate 21, and the second decorative side plate 22 are preferably formed of the same material as the ceiling material 11 in the same color as that of the ceiling material 11. For example, when the ceiling material 11 is made of non-colored wood, the decorative upper plate 20, the first decorative side plate 21, and the second decorative side plate 22 are also preferably made of non-colored wood. Note that the decorative upper plate 20, the first decorative side plate 21, and the second decorative side plate 22 form an inner surface of the groove part 15, and are parts that are hidden from the line of sight from the indoor side and are hardly visually recognized. Therefore, the decorative upper plate, the first decorative side plate, and the second decorative side plate may have a material or a color different from that of the ceiling material 11. A lower end of the first decorative side plate 21 of the groove part 15 is disposed so as to be lower than a height of a lower surface of a frame 23 on an upper side of the opening part 5.

A cover body 24*a* is fixed to the lower end of the first decorative side plate 21 of the groove part 15. The cover body 24*a* has a flat plate shape, and is formed to extend from the lower end of the first decorative side plate 21 toward a lower side of the groove part 15 at the same slope as that of the sloped ceiling 2. In the cover body 24*a*, a parting part 25 is formed so as to cover an end face and a part of a lower surface of the ceiling material 11 forming the sloped ceiling 2 at a base end part thereof. The cover body 24*a* is formed by stacking a plurality of plates, and the parting part 25 of the cover body 24*a* is formed such that an upper side protrudes upward in the slope direction, and serves as the board joist 10 that abuts on an upper surface of the ceiling material 11 and fixes the ceiling material 11 to the ceiling base plate 9 of plasterboard at a distance. A lower end surface of the parting part 25 of the cover body 24*a* abuts against the end face of the ceiling material 11, and a lower part of the lower end surface slightly protrudes upward in the slope direction to form a groove, and covers the end face and a part of the lower surface of the ceiling material 11. A tip of the cover body 24*a* extends so as to cover more than or equal to half of the lower opening 14 of the groove part 15 in the horizontal direction. As a result, when viewed from the indoor side, the inside of the groove part 15 is hidden by the cover body 24*a* and cannot be seen, and the opening part 5 is visually recognized as it is from the tip of the cover body 24*a*.

The cover body 24*a* is preferably made of the same material as the ceiling material 11 forming the sloped ceiling 2 in the same color as that of the ceiling material 11. Here, for example, when the ceiling material 11 is made of wood, the cover body 24*a* is also preferably made of wood of the same type. Further, when the ceiling material 11 is not colored, the cover body 24*a* is also preferably not colored, and when the ceiling material 11 is colored, the cover body 24*a* is also preferably colored in the same color. Note that the cover body 24*a* is not limited to this, and even if the cover body is made of a different material or has a different color, the cover body may be made of any material or have any color as long as it does not impair the color arrangement or design property integrally seen with the ceiling material 11 when viewed from the indoor side.

The opening part 5 formed in the outer wall 6 is formed by a plurality of shoji screens 29 each including a rectangular frame 27 and a translucent part 28, a sash frame 30 accommodating the shoji screens 29 so as to be able to be separated from each other, and a frame 23 formed on an indoor side of the sash frame 30 and serving as a parting material with respect to an inner wall material. Although not illustrated, the sash frame 30 is, for example, a full flat sash having a lower end flush with a floor surface. Further, the frame 23 is formed on a side edge and an upper edge on the indoor side of the opening part 5, and although not illustrated, a lower edge of the opening part 5 is continuous to the sash frame 30 in which a floor material is full flat. Note that the sash frame 30 of the opening part 5 is not limited to a full flat sash that is flush with the floor surface, and may be, for example, a sash frame of a waist window in which a lower end of the sash frame 30 has a waist height. When the sash frame 30 has a waist height, the frame 23 is formed not only on the side edge and the upper edge on the indoor side of the opening part 5 but also on the lower edge on the indoor side of the opening part 5. The translucent part 28 of each of the shoji screens 29 is a glass plate, and the rectangular frame 27 is formed in an aluminum frame such that the translucent part 28 is supported by a glazing channel 31.

As illustrated in FIG. 3, the translucent part 28 is disposed such that the upper end thereof is higher than the tip of the cover body 24*a*. Specifically, the tip of the cover body 24*a* is located lower than an upper end of a visible position of a glass plate forming the translucent part 28, that is, a lower end of the glazing channel 31 supporting the upper end of the glass plate. A distance $\alpha$ between the lower end of the upper glazing channel 31 and the lowest position of the cover body 24*a* is, for example, 20 to 30 mm. It should be noted that the present invention is not limited to this dimension. Therefore, when viewed from the indoor side, the frame 23 of the opening part 5, the sash frame 30, and the rectangular frame 27 of each of the shoji screens 29 are hardly seen by the cover body 24*a*, so that the translucent part 28 is visually recognized immediately below the tip of the cover body 24*a*, and the outdoors are visually recognized through the translucent part 28. As a result, the indoor space can be an open space with an open field of view.

The eaves 3 formed on the outdoor side of the outer wall 6 is supported by the rafter 13 that is bridged over a ridge beam (not illustrated) and the pole plate 12 and protrudes to the outdoor side from the pole plate 12. Although not illustrated, a sheathing roof board, a roofing member, and a roof member are disposed on the rafter 13, and are continuously disposed from the roof of the building. Under the rafter 13, a joist 33 is fixed via a purlin material 32, a refractory surface material 34 is attached to the joist 33, and a decorative eaves rear surface material 35 forming the eaves rear 4 is disposed on the refractory surface material 34 via the board joist 10. The refractory surface material 34 and the decorative eaves rear surface material 35 are parallel to the indoor sloped ceiling 2, and an end part of the eaves rear 4 on a side of the outer wall 6 is disposed at a position higher than the lower end of the sloped ceiling 2.

On the outdoor side of the outer wall 6, a shutter box 36 is provided above the opening part 5. The shutter box 36 is formed such that a part of an upper surface thereof has the same slope as that of the eaves rear 4, and is disposed such that a lower surface of the shutter box 36 is above the opening part 5 without interfering with the rafter 13. An end part on an upper end side of the refractory surface material 34 abuts on a side surface on the outdoor side of the shutter box 36, and the refractory surface material 34 and the shutter box 36 form a refractory line at an end part of the eaves rear 4. As illustrated in FIG. 2, at a position where the opening part 5 is not provided, the shutter box 36 is interrupted, and a side edge of the refractory surface material 34 abuts on the surface of the outer wall 6 while abutting on the side surface of the shutter box 36, so that the refractory line can be formed.

Second Embodiment

Next, a building structure 1*b* according to a second embodiment will be described with reference to FIG. 4. Note that components similar to those of the building structure 1*a* of the first embodiment are denoted by the same reference signs, and description thereof is omitted. In a building structure 1*b* of the second embodiment, similarly to the first embodiment, a sloped ceiling 2, an opening part 5, and eaves 3 are formed, and a box-shaped groove part 15 having a lower opening 14 opened downward is formed at a lower end of the sloped ceiling 2 along an outer wall 6 at a position where the opening part 5 of the sloped ceiling 2 is formed. Two curtain rails 38 are provided inside the groove part 15. In the present embodiment, the two curtain rails 38 are attachment parts for fixing the upper ends of a light shielding material. Further, in the present embodiment, curtains 37 hung on the curtain rails 38 correspond to the light shielding material in the present invention. Note that the light shielding material is not limited to the curtains 37 in a case where the groove part 15 of the present embodiment is accommodated, and may be a roll screen or another light shielding material capable of shielding external light and a line of sight from the outside. When the light shielding material is not the curtains 37, the attachment parts are not the curtain rails 38 but another member capable of fixing the upper ends of the light shielding material.

In the groove part 15, a base groove is formed by a pair of side surface base plates 18 made of plasterboard and an upper surface base plate 19 connecting upper ends of the pair of side surface base plates 18, a decorative upper plate 20 is attached to a lower surface of the upper surface base plate 19, a first decorative side plate 21 is attached to the side surface base plate 18 on a side away from the opening part 5, and a second decorative side plate 22 is attached to the side surface base plate 18 on a side of the opening part 5. Similarly to the first embodiment, the decorative upper plate 20, the first decorative side plate 21, and the second decorative side plate 22 are preferably formed of the same material as a ceiling material 11 in the same color as that of the ceiling material 11.

A cover body 24*b* is fixed to a lower end of the first decorative side plate 21 of the groove part 15. The cover body 24*b* in the present embodiment is formed to slightly protrude from the lower end of the first decorative side plate 21 toward the lower side of the groove part 15 with the same slope as that of the sloped ceiling 2. In order to avoid interference with the curtains 37 hung on the two curtain rails 38 in the groove part 15, a protruding length of the cover body 24*b* is formed to be shorter than that in the first embodiment. In the cover body 24*b*, a parting part 25 is formed so as to cover an end face and a part of a lower surface of the ceiling material 11 forming the sloped ceiling 2. The cover body 24*b* is preferably made of the same material as the ceiling material 11 forming the sloped ceiling 2 in the same color as that of the ceiling material 11. A lower end of cover body 24*b* is formed lower than a lower surface of an upper frame 23 formed in the opening part 5.

Since the eaves 3 and a shutter box 36 formed on the outdoor side of the outer wall 6 have the same configurations as those of the first embodiment, the description thereof will be omitted.

Third Embodiment

Next, a building structure 1*c* according to a third embodiment will be described with reference to FIGS. 5 and 6. Note that configurations similar to those of the building structures 1*a* and 1*b* of the first embodiment and the second embodiment are denoted by the same reference signs, and description thereof is omitted. In a building structure 1*c* of the third embodiment, similarly to the first embodiment and the second embodiment, a sloped ceiling 2, an opening part 5, and eaves 3 are formed, and a box-shaped groove part 15 having a lower opening 14 opened downward is formed at a lower end of the sloped ceiling 2 along an outer wall 6 at a position where the opening part 5 of the sloped ceiling 2 is formed. As in the second embodiment, two curtain rails 38 are provided inside the groove part 15. In the present embodiment, the two curtain rails 38 are attachment parts for fixing the upper ends of a light shielding material. Further, in the present embodiment, curtains 37 hung on the curtain rails 38 correspond to the light shielding material in the present invention. Note that the light shielding material is not limited to the curtains 37 in a case where the groove part 15 of the present embodiment is accommodated, and may be a roll screen or another light shielding material capable of shielding external light and a line of sight from the outside. When the light shielding material is not the curtains 37, the attachment parts are not the curtain rails 38 but another member capable of fixing the upper ends of the light shielding material.

The sloped ceiling 2 is formed as follows. First, a steel joist 8 is fixed parallel to a slope direction of the sloped ceiling 2 by suspending a joist receiver (not illustrated) on a slope beam 7. Then, a ceiling base plate 9 made of two plasterboards is attached to the steel joist 8. A decorative cloth 39 is attached to a lower surface of the ceiling base plate 9 to form the sloped ceiling 2.

Further, the groove part 15 forms a base groove by a pair of side surface base plates 18 made of plasterboard and an upper surface base plate 19 connecting upper ends of the pair of side surface base plates 18. The same decorative cloth 39 as that of the sloped ceiling 2 is attached to each of inner surfaces of the groove part 15 of the side surface base plate 18 and the upper surface base plate 19 on a side of the opening part 5. A decorative side plate 40 is stuck to an inner surface of the groove part 15 of the side surface base plate 18 on a side opposite to the opening part 5. In the decorative side plate 40, an end part of the ceiling base plate 9 forming the sloped ceiling 2 is inserted, and a groove-shaped parting part 26 covering an end face and a part of a lower surface of the ceiling base plate 9 is formed. The decorative side plate 40 preferably has a texture and a color similar to those of the decorative cloth 39 forming the sloped ceiling 2.

Since the same decorative cloth 39 as that of the sloped ceiling 2 is attached to the inner surface of the side surface base plate 18 of the groove part 15 on the side of the opening part 5 and the inner surface of the upper surface base plate 19 of the groove part 15, the same decorative cloth 39 is attached to all positions where the inside of the groove part 15 is easily visible from the indoor side, and the sloped ceiling 2 and the groove part 15 are integrated. As a result, a boundary between the indoor and outdoor is not emphasized by the groove part 15, and the continuity between the indoors and outdoors can be maintained. Further, the decorative side plate 40 is attached on the inner surface of the groove part 15 of the side surface base plate 18 on the side opposite to the opening part 5, and the parting part 26 that covers the end face and a part of the lower surface of the ceiling material 11 of the sloped ceiling 2 is formed on the decorative side plate 40. Therefore, a position where the sloped ceiling 2 and the groove part 15 are butted becomes an acute angle, but the parting part 26 is formed without providing the decorative cloth 39, and the fitting of the end part of the decorative cloth 39 can be made clean while suppressing cutting of the decorative cloth 39.

As illustrated in FIG. 6, a lower end of the decorative side plate 40, which is a side plate of the groove part 15 on a side opposite to the opening part 5, is formed to be lower than a height of a lower surface of a frame 23 on an upper side of the opening part 5. A distance β between the frame 23 on the upper side of the opening part 5 and the lower end of the decorative side plate 40 is, for example, about 20 to 30 mm. It should be noted that the present invention is not limited to this dimension. As a result, when viewed from the indoor side, it is visually recognized that the opening part 5 is disposed immediately below the lower end of the sloped ceiling 2, and the outdoor side can be visually recognized through the opening part 5, and it is possible to give an impression that the sloped ceiling 2 and the outdoors are connected, and to make the landscape from the indoor side clearer.

Since the eaves 3 and a shutter box 36 formed on the outdoor side of the outer wall 6 have the same configurations as those of the first embodiment, the description thereof will be omitted.

It goes without saying that the embodiments of the present invention are not limited to the above-described embodiments, and can be appropriately changed without departing from the scope of the idea of the present invention.

INDUSTRIAL APPLICABILITY

The building structures 1*a*, 1*b*, and 1*c* according to the present invention are suitable as the building structure 1 of a house in which a landscape from indoors to outdoors can be enjoyed.

DESCRIPTION OF REFERENCE SIGNS

1*a*, 1*b*, 1*c* building structure
2 sloped ceiling
4 eaves rear
5 opening part
6 outer wall
11 ceiling material
14 lower opening
15 groove part
16 roll screen (light shielding material)
17 attachment part
18 side surface base plates
19 upper surface base plate
20 decorative upper plate
21 first decorative side plate
22 second decorative side plate
23 frame
24*a, b* cover body
25 parting part of cover body
26 parting part of decorative side plate
28 translucent part
34 refractory surface material
37 curtains (light shielding material)
38 curtain rails (attachment part)
40 decorative side plate (side plate)

The invention claimed is:

1. A building structure comprising:
an outer wall provided on a lower side of a sloped ceiling in a slope direction;
an opening part formed in the outer wall;
a box-shaped groove part formed at a lower end of the sloped ceiling along the outer wall and having a lower opening opened downward; and
an attachment part provided inside the groove part and to which an upper end part of a light shielding material that shields light incident on the opening part is attached,
wherein the groove part is a ceiling-embedded type embedded in the sloped ceiling, and
a lower end of a side plate of the groove part on a side opposite to the opening part is lower than a height of a lower surface of a frame on an upper side of the opening part.

2. The building structure according to claim 1, wherein
the groove part is formed to extend from a lower end of the side plate on the side opposite to the opening part toward a lower side of the groove part, and a cover body that covers a part of the lower opening of the groove part is formed, and
the cover body has a flat plate shape, and a lower surface of the cover body has a slope identical with that of the sloped ceiling.

3. The building structure according to claim 2, wherein
the opening part has a translucent part in a rectangular frame, and
an upper end of the translucent part is higher than a lower end of the cover body.

4. The building structure according to claim 3, wherein the cover body is formed of a material identical with a ceiling material forming the sloped ceiling in a color identical with that of the ceiling material.

5. The building structure according to claim 3, wherein the cover body includes, on a base end side of the cover body, a parting part that covers an end face and a part of a lower surface of the ceiling material forming the sloped ceiling.

6. The building structure according to claim 3, further comprising eaves on an outdoor side of the outer wall, and a shutter box on the opening part on the outdoor side of the outer wall, wherein an eaves rear of the eaves includes a refractory surface material on an upper side of a decorative eaves rear surface material, the eaves rear is parallel to the sloped ceiling, and an end part of the eaves rear on a side of the outer wall is disposed at a position higher than a lower end of the sloped ceiling, and the shutter box has an upper surface formed with a slope identical with that of the eaves rear, and an end part of the refractory surface material abuts on a side surface of the shutter box.

7. The building structure according to claim 2, wherein the cover body is formed of a material identical with a ceiling material forming the sloped ceiling in a color identical with that of the ceiling material.

8. The building structure according to claim 7, wherein the cover body includes, on a base end side of the cover body, a parting part that covers an end face and a part of a lower surface of the ceiling material forming the sloped ceiling.

9. The building structure according to claim 7, further comprising eaves on an outdoor side of the outer wall, and a shutter box on the opening part on the outdoor side of the outer wall, wherein an eaves rear of the eaves includes a refractory surface material on an upper side of a decorative eaves rear surface material, the eaves rear is parallel to the sloped ceiling, and an end part of the eaves rear on a side of the outer wall is disposed at a position higher than a lower end of the sloped ceiling, and the shutter box has an upper surface formed with a slope identical with that of the eaves rear, and an end part of the refractory surface material abuts on a side surface of the shutter box.

10. The building structure according to claim 2, wherein the cover body includes, on a base end side of the cover body, a parting part that covers an end face and a part of a lower surface of the ceiling material forming the sloped ceiling.

11. The building structure according to claim 10, further comprising eaves on an outdoor side of the outer wall, and a shutter box on the opening part on the outdoor side of the outer wall, wherein an eaves rear of the eaves includes a refractory surface material on an upper side of a decorative eaves rear surface material, the eaves rear is parallel to the sloped ceiling, and an end part of the eaves rear on a side of the outer wall is disposed at a position higher than a lower end of the sloped ceiling, and the shutter box has an upper surface formed with a slope identical with that of the eaves rear, and an end part of the refractory surface material abuts on a side surface of the shutter box.

12. The building structure according to claim 2, further comprising eaves on an outdoor side of the outer wall, and a shutter box on the opening part on the outdoor side of the outer wall, wherein an eaves rear of the eaves includes a refractory surface material on an upper side of a decorative eaves rear surface material, the eaves rear is parallel to the sloped ceiling, and an end part of the eaves rear on a side of the outer wall is disposed at a position higher than a lower end of the sloped ceiling, and the shutter box has an upper surface formed with a slope identical with that of the eaves rear, and an end part of the refractory surface material abuts on a side surface of the shutter box.

13. The building structure according to claim 1, wherein the sloped ceiling is formed by attaching a decorative cloth to a base surface formed of a ceiling base material, the groove part has a pair of side surface base plates and an upper surface base plate connecting upper ends of the side surface base plates to each other, in the groove part, a decorative cloth identical with that of the sloped ceiling is attached to inner surfaces of the groove part of the side surface base plate on a side of the opening part and the upper surface base plate, and the side surface base plate on a side opposite to the opening part is covered with a decorative side plate in which a parting part that covers an end face and a part of a lower surface of the ceiling base plate forming the sloped ceiling is formed.

14. The building structure according to claim 13, further comprising eaves on an outdoor side of the outer wall, and a shutter box on the opening part on the outdoor side of the outer wall, wherein an eaves rear of the eaves includes a refractory surface material on an upper side of a decorative eaves rear surface material, the eaves rear is parallel to the sloped ceiling, and an end part of the eaves rear on a side of the outer wall is disposed at a position higher than a lower end of the sloped ceiling, and the shutter box has an upper surface formed with a slope identical with that of the eaves rear, and an end part of the refractory surface material abuts on a side surface of the shutter box.

15. The building structure according to claim 1, further comprising eaves on an outdoor side of the outer wall, and a shutter box on the opening part on the outdoor side of the outer wall, wherein an eaves rear of the eaves includes a refractory surface material on an upper side of a decorative eaves rear surface material, the eaves rear is parallel to the sloped ceiling, and an end part of the eaves rear on a side of the outer wall is disposed at a position higher than a lower end of the sloped ceiling, and the shutter box has an upper surface formed with a slope identical with that of the eaves rear, and an end part of the refractory surface material abuts on a side surface of the shutter box.

* * * * *